B. KENT & A. AUSTIN.
GRAIN SHOCKER.
APPLICATION FILED JUNE 6, 1917.
1,261,404.
Patented Apr. 2, 1918.
5 SHEETS—SHEET 1.
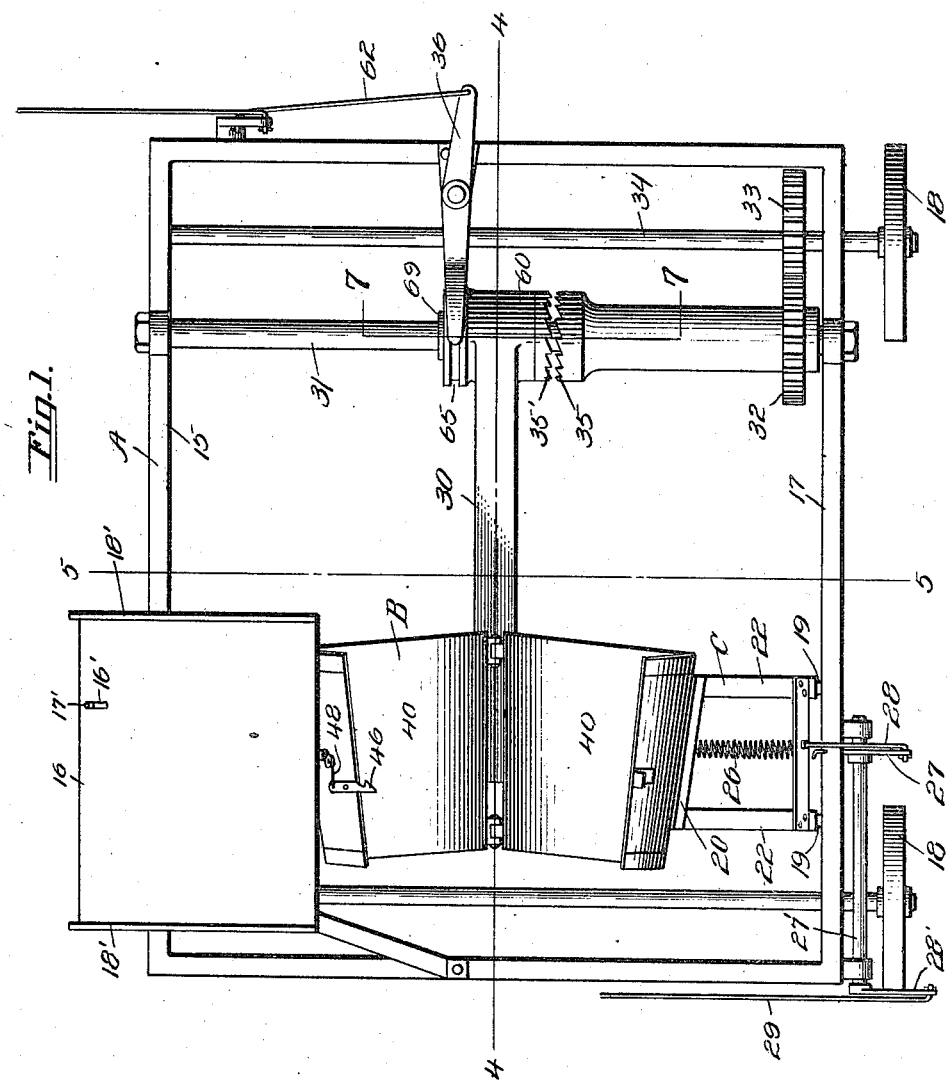
WITNESSES
F. C. Gibson.
INVENTOR
Bennie Kent.
Atwell Austin.
BY Victor J. Evans
ATTORNEY

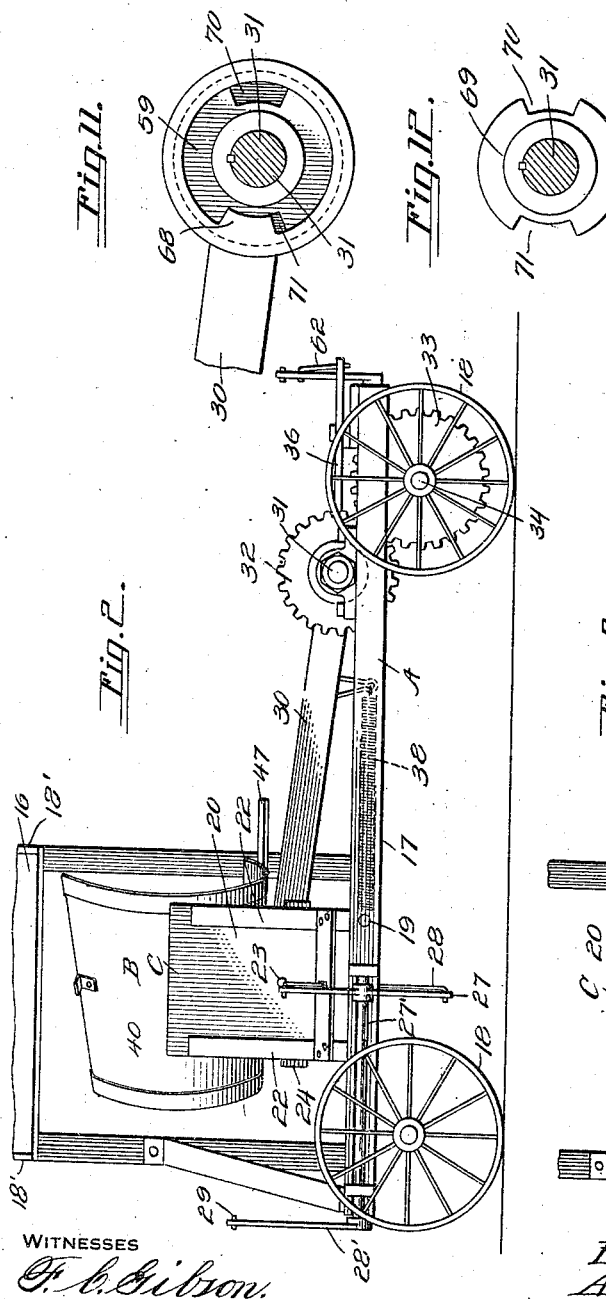
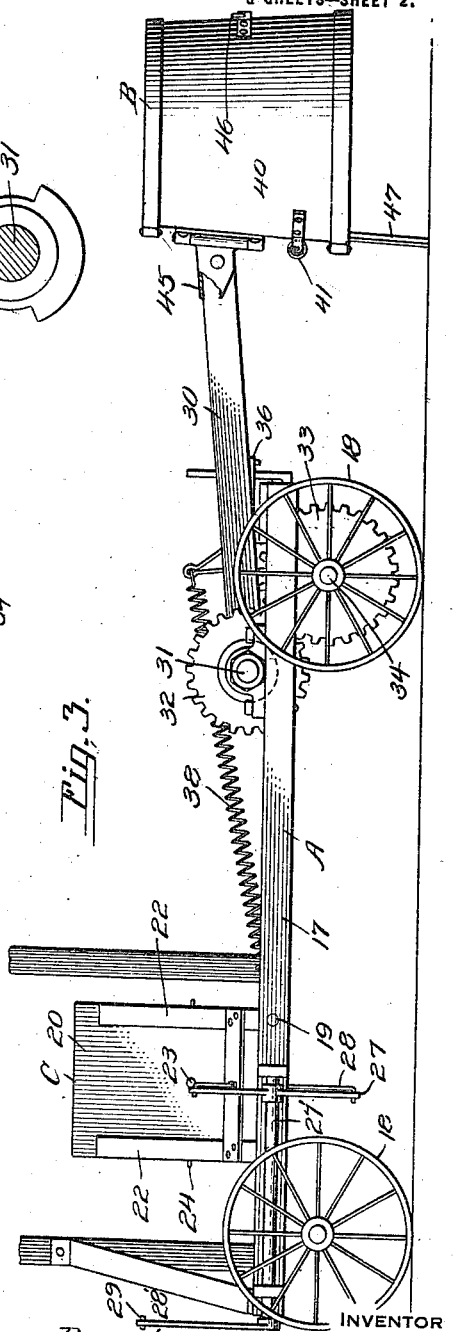

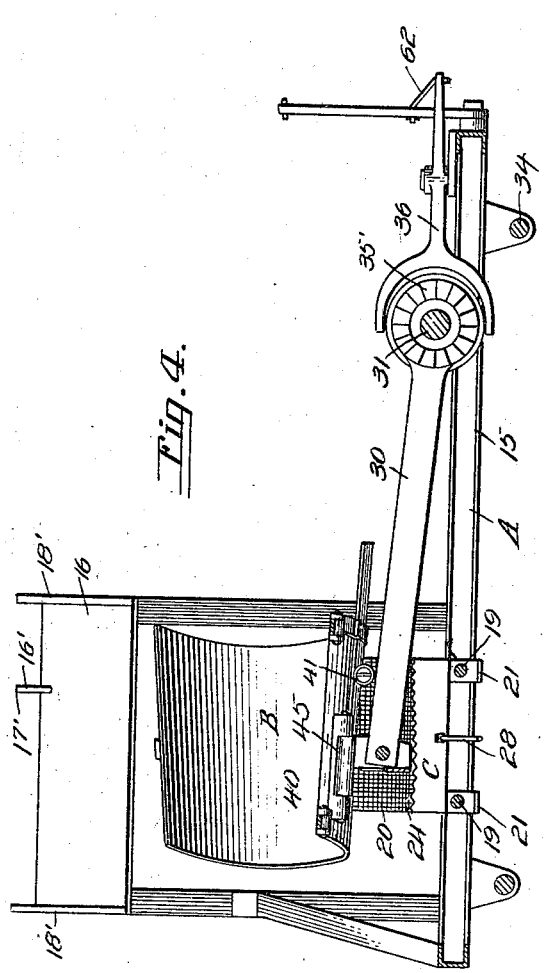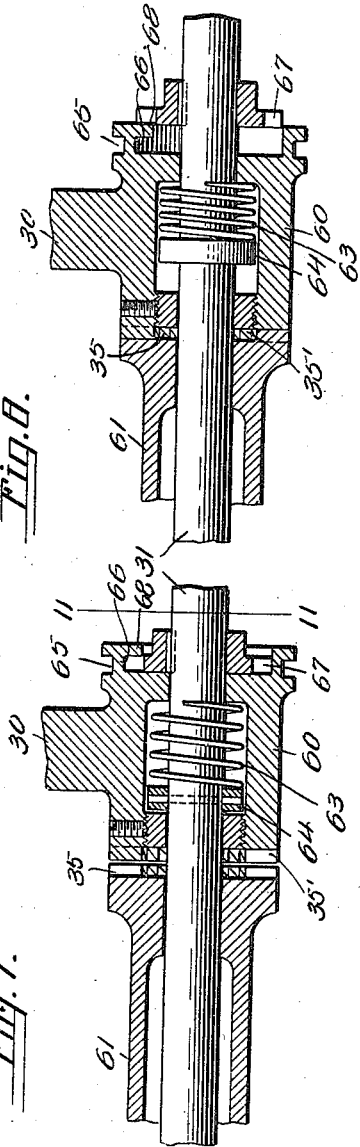

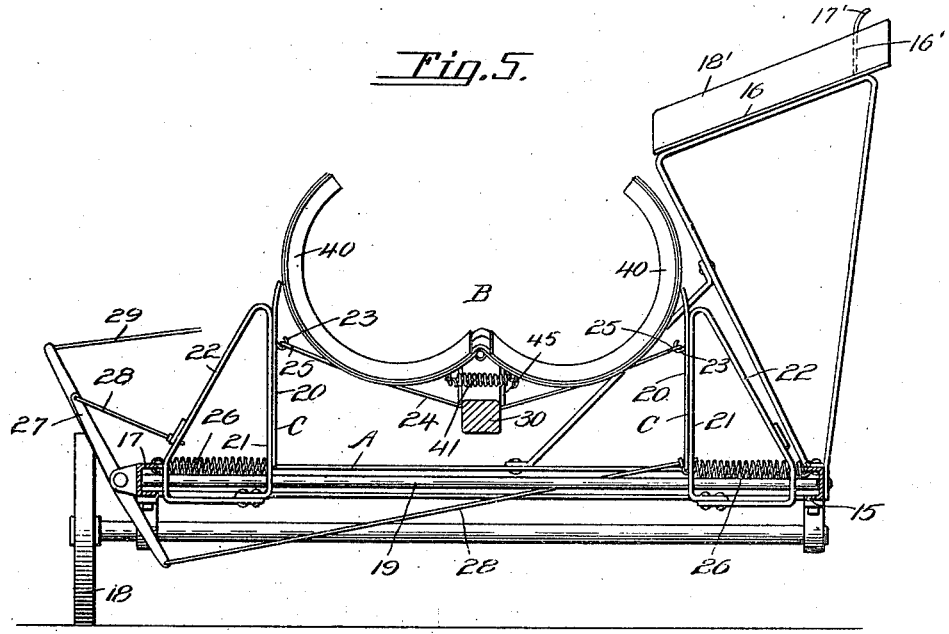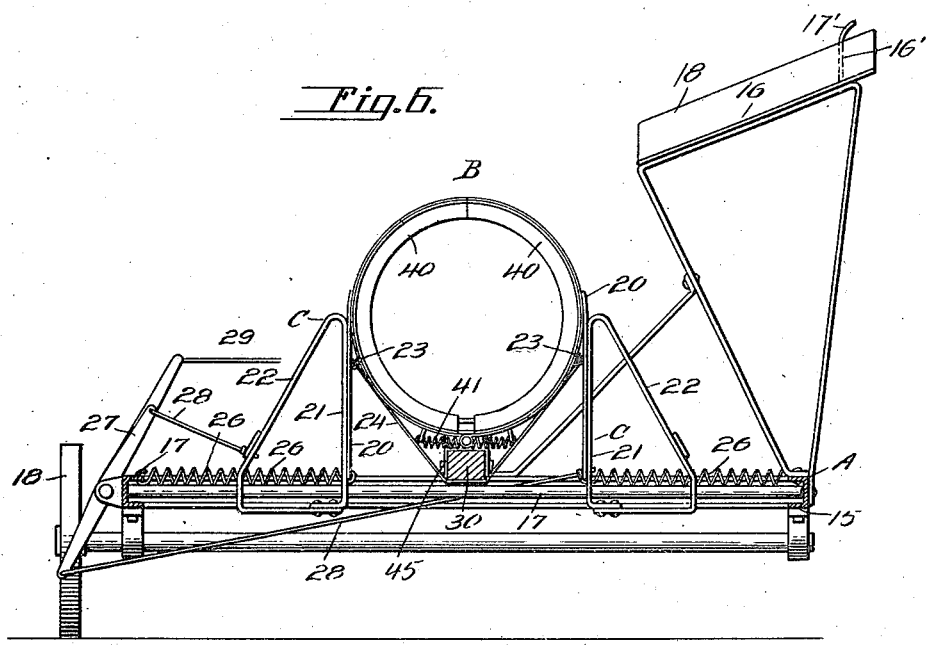

UNITED STATES PATENT OFFICE.

BENNIE KENT AND ATWELL AUSTIN, OF REDROCK, OKLAHOMA, ASSIGNORS OF ONE-HALF TO GEORGE NUZUM, OF WHITE CLOUD, KANSAS.

GRAIN-SHOCKER.

1,261,404.  Specification of Letters Patent.  Patented Apr. 2, 1918.

Application filed June 6, 1917. Serial No. 173,211.

*To all whom it may concern:*

Be it known that we, BENNIE KENT and ATWELL AUSTIN, citizens of the United States, residing at Redrock, in the county of Noble and State of Oklahoma, have invented new and useful Improvements in Grain-Shockers, of which the following is a specification.

This invention relates to grain shocking machines and it has for its object to produce a simple and effective machine of this class which may be attached to a binder of ordinary conventional construction for the purpose of receiving the bundles that are discharged over the binder table after which such bundles are discharged on the ground in the form of a shock.

The present invention has for its object to simplify and improve the construction and operation of the grain receiving cradle whereby the bundles are received, compacted to form a shock, and eventually discharged upon the ground.

A further object of the invention is to produce a flexible supporting means for the cradle while the latter is in bundle receiving position, thereby avoiding excessive strain on the cradle carrying arm and on other parts of the machine.

A further object of the invention is to produce simple and improved means for closing the cradle after a sufficient number of bundles have been accumulated therein.

A further object of the invention is to produce closing slides that are capable of being actuated by the driver or operator of the binder when a sufficient number of bundles have accumulated in the cradle, said slides serving also to support and carry the flexible supporting element for the cradle.

A further object of the invention is to simplify and improve the construction and operation of the cradle actuating mechanism whereby the cradle is swung from its receiving to its discharging position and returned.

A further object of the invention is to simplify and improve the latch or locking device for the cradle and the means for actuating the same.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawings,

Figure 1 is a top plan view of a machine constructed in accordance with the invention.

Fig. 2 is a side elevation of the same showing the cradle in receiving position.

Fig. 3 is a side elevation showing the cradle in discharging position.

Fig. 4 is a longitudinal sectional view taken on the line 4—4 in Fig. 1.

Fig. 5 is a transverse sectional view taken on the line 5—5 in Fig. 1 and showing the cradle open.

Fig. 6 is a sectional view similar to Fig. 5 but showing the cradle closed.

Fig. 7 is a sectional detail view taken on the line 7—7 in Fig. 1.

Fig. 8 is a view similar to Fig. 7 but showing the clutch members in mesh.

Fig. 11 is a sectional view taken on the line 11—11 in Fig. 7 and showing the cam member and related parts in elevation.

Fig. 12 is a view showing the cam member in elevation and the shaft on which it is mounted in section.

Corresponding parts in the several figures are denoted by like characters of reference.

Figure 9:
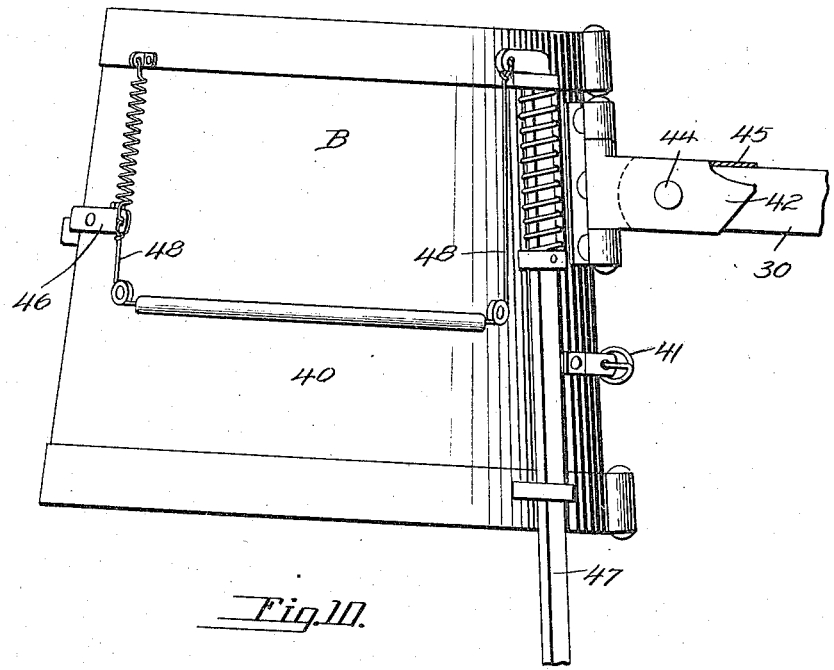
Fig. 9 is a side view of the cradle showing the same closed.
Figure 10:
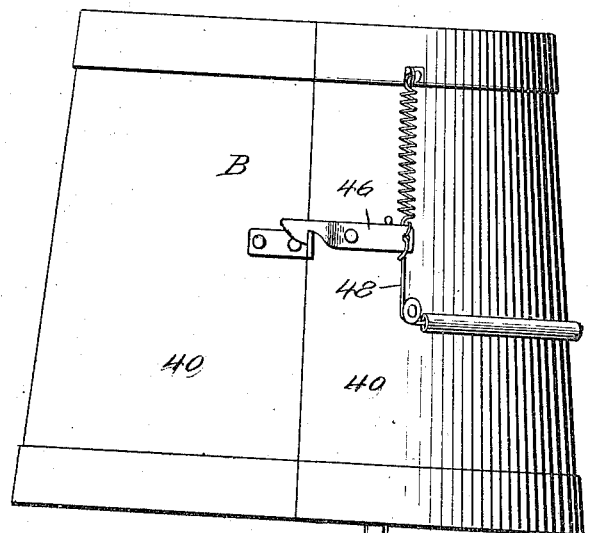
Fig. 10 is a plan view showing the cradle closed.

The frame A of the improved machine which is mainly of rectangular form may be made of structural steel or other suitable material with a view to obtaining sufficient strength without excessive weight. One of the side members of the frame designated by 15 is bolted or otherwise secured on the frame of the binder in the position which is usually occupied by the bundle carrier.

Said side member supports a platform 16 which is inclined downwardly and outwardly for the purpose of receiving the bundles ejected from the binder, said platform being so positioned that one edge thereof will project slightly beneath the binder table. Mounted on the table 16 and projecting upwardly with respect thereto is a bundle turning device consisting of a rod or bar 16', the same being slightly curved at its upper end as indicated at 17'; the purpose of this device being to strike each bundle as it is being ejected from the binder, near the head thereof, causing said bundle to turn end for end or reversing the same so as to present the butt end thereof in the proper direction. The platform 16 is provided at its front and rear ends with upstanding flanges 18' which will prevent any improper displacement of the bundle. The other side member 17 carries ground engaging supporting wheels 18 whereby the weight of the frame will be supported to enable it to travel freely over the ground along with the binder.

The frame is provided with rods 19 extending transversely between the side members 15, 17, said rods serving to constitute a track on which carriages C are mounted for sliding movement. Said carriages will be hereinafter referred to as the cradle closers, this term being clearly descriptive of their function. Each of these cradle closers is composed of a wall member 20 having legs 21 and braces 22 that are apertured for engagement with the track rods 19; it being understood that anti-friction means may be employed where desired in order to enable the cradle closers to slide freely along the track rods. The opposed faces of the cradle closers are provided with hooks 23 serving to support a flexible element or mat 24 which may be constructed in any convenient manner of woven wire or any other material possessing sufficient strength and durability for the purpose of the invention. It is preferred that the material used in the construction of the mat be of a somewhat elastic nature, but this is not essential or absolutely necessary because any material such as sheet metal might be employed, assuming the same to be sufficiently flexible for the purpose. The mat 24 is preferably provided at the ends thereof with eyes or rings 25 adapted for engagement with the hooks 23. Retracting springs 26 are provided for the purpose of retracting the cradle closers in the direction of the side members of the frame.

Fulcrumed on the outer side member 17 is a lever 27 the two arms of which are connected with the cradle closers C by rods 28 whereby, by actuating the lever, the cradle closers may be forced in the direction of each other against the tension of the retracting springs, it being evident that when such movement takes place the mat 24 carried by the closers will be permitted to sag between the same. When the closers are retracted by their respective springs, the mat will obviously be stretched or tensioned. The lever 27 may be mounted on a rock shaft 27' and it may be actuated by the driver of the binder by means of a connecting element 29 leading from an arm 28' on said rock shaft to a point in suitable proximity to the driver's seat, said connecting element being of a flexible nature and the same being guided in any well known manner.

The cradle B which serves to receive the bundles from the binder to form the same into a shock and to carry the shock to the place of deposit on the ground, is hingedly connected with an arm 30, said arm having a hub or sleeve 60 whereby it is pivotally mounted on a stationary shaft 31 supported on the side members 15, 17 of the frame. Mounted for rotation on the shaft 31 is a sleeve 61 carrying a pinion 32 meshing with a gear wheel 33 on a shaft 34 which is being constantly rotated when the machine is in operation and which may be driven in any convenient manner. In the drawings the said shaft has been shown as constituting the axle which carries the rearward supporting wheel 18, said axle being mounted for rotation in the frame. The sleeve 61 constitutes a clutch member having a ratchet toothed face 35 adapted for engagement with the correspondingly toothed face 35' of the hub or sleeve 60. The said hub or sleeve has a limited sliding movement on the shaft 31 and it may be thrown in mesh with the clutch member 35 by means of a shipping lever 36, the latter being adapted to be operated by the driver of the binder by means of a suitably guided flexible element 62. Within the hub or sleeve 60 is arranged a retracting spring 63 abutting at one end on an end wall of the hub or sleeve and at the other end on a disk or stop member 64 which is fixed on the shaft 31, the hub or sleeve 60 being made hollow for the accommodation of said spring and stop member, as best seen in Figs. 7 and 8. The sleeve or hub 60 is also provided with an external annular flange 65 which is engaged by the bifurcated end of the shipping lever 36.

It will be seen that when the hub or sleeve 60 is actuated by the shipping lever 36 to place its clutch face 35' in engagement with the clutch face 35 of the constantly rotating sleeve 61, the arm 30 carrying the cradle B will be swung from the receiving position shown in Fig. 2 to the discharging position shown in Fig. 3. It is, however, essential that when the discharging position is reached, the clutch faces be immediately placed out of engagement with each other in order that the swinging movement of the arm 30 may be interrupted. For the purpose of automatically accomplishing this, the hub or sleeve 60 is provided at one end thereof with an annular flange 66 forming a chamber or recess 67, said flange having a lug or tooth 68 that extends in the direction of the axis of the shaft 31. Fixed on the shaft 31 is a cam member 69 constructed as best seen in Fig. 12, said cam member consisting of a disk provided at diametrically opposite sides thereof with notches or recesses 70, 71 for the passage of the lug or tooth 68. These recesses will be so located that when the cradle carrying arm is in the receiving position indicated in Fig. 2, the recess 70 will be in registry with the lug or tooth 68. When the arm 30 is swung to the discharging position shown in Fig. 3, the lug or tooth 68 will register with the recess 71. Moreover, when the cradle carrying arm is in receiving position, the hub or sleeve 60 will be retracted by the spring 63, and the disk or cam member 69 will be located within the recess 67. When, for the purpose of swinging the cradle carrying arm to a discharging position, the sleeve or hub 60 is moved in the direction of the sleeve 61, the lug or tooth 68 will pass through the recess 70 of the cam member, the latter being thus positioned externally of the sleeve or hub 60 as seen in Fig. 8, the cam member 69 serving, by contact with the lug or tooth 68, to maintain the sleeve or hub 60 in engagement with the clutch sleeve 61 until the discharge position is reached; the lug or tooth 68 will now be in registry with the notch 71 of the cam member, permitting the sleeve or hub 60 to be restored by the action of the retracting spring 63 to the initial position indicated in Fig. 7. A retracting spring 38 is provided which will now function to restore the cradle carrying arm to the receiving position illustrated in Fig. 2.

The cradle B is composed of two shields or side-members 40 each of which is approximately semi-circular in cross section, said shields being, however, tapered in one direction so that when assembled or folded together they will form a truncated conical structure adapted to form a shock of the requisite size. The members 40 are hinged together, and each of said members is connected with one end of a spring 41, the tension of which is exerted to open the cradle. Each of the members 40 has adjacent to the hinged edge thereof an arm or bracket 42, said brackets being connected with the members 40 by hinge bolts 43. The arms or brackets 42 are apertured for the passage of a bolt or pivot member 44 whereby they are hingedly connected with the arm 30, each of said brackets being provided with a limiting flange 45 which constitutes a stop member whereby the swinging movement of the cradle with respect to the arm 30 is limited in one direction. The free edges of the members 40 are adapted to be connected together by a spring latch 46 which is adapted to be actuated to release or unlock the same by a sliding arm or bar 47 which is mounted exteriorly on one of the members 40, said slide being connected with the latch 46 by a flexible connection 48. The slide 47 is adapted to project beyond the large end of the cradle which is lowermost when the cradle is in discharging position, the parts being so arranged that by contact with the ground the slide will function to release the latch 46, causing the cradle to be thrown open or the members 40 thereof to be swung to an open position by the tension of the spring 41.

From the foregoing description, taken in connection with the drawings hereto annexed, the operation and advantages of this invention will be readily understood by those skilled in the art to which it appertains. When the device is attached to a binder in position for operation as herein shown and described it will travel along with the binder and, assuming the cradle to be in bundle-receiving position where it is normally maintained by the tension of the spring 38, the cradle will be supported on the mat 24 which extends between the closers C. The bundles will be discharged from the binder directly into the cradle and when a sufficient number has accumulated therein to form a shock, the driver by means of the lever 27 actuates the closers C to move the same toward each other. This will cause the mat 24 to sag under the weight of the cradle and the walls of the closers will now exert pressures on the members 40 of the cradle to close the same together, thereby forming and compacting the shock. This pressure is continued until the latch 46 functions to connect the free edges of the members 40 together. The lever 27 is now released and restored to its initial position by the retracting spring 26 the tension of which will now be exerted to move the closers apart, thereby stretching or tensioning the mat 24 or tending to produce this result. At the same time the operator by means of the shipping lever 36 throws into gear the clutch mechanism whereby the cradle carrying arm 30 is operatively connected with the constantly rotating sleeve 61, causing the arm and the cradle to swing about the axis of the shaft 31. After the arm 30 has passed an approximately vertical position, the cradle will gravitate to an angular position with respect to the arm, this being due to the fact that the hinge brackets 42 are positioned relatively near the small end of the cradle the preponderance in the weight of which is in the large or lower end. Thus, as the cradle approaches the ground, the shock will assume an upright position and will presently be placed, with the butt ends of the bundles down, on the ground. At this moment, or just before the butt ends of the bundles touch the ground, the slide 47 should strike the surface of the ground, thereby releasing the latch and permitting the members 40 of the cradle to swing open, thus leaving the shock standing on the field while the machine advances. The precise moment of releasing the latch 46 may readily be determined by making the slide 47 of proper length to engage the ground at the desired time. At the moment of delivery of the shock on the ground, the clutch device 35, 35' is thrown out of gear by the means provided for the purpose, thereby freeing the arm 30 from the sleeve 61 and permitting said arm together with the cradle to be restored to its initial position on the mat 24 between the closers C under the influence of the retracting spring 38, thus placing the machine in condition for a repetition of the operation.

Having thus described the invention, what is claimed as new is:

1. In a grain shocking machine, a shock forming cradle comprising two hingedly connected members, and a spring whereby said members are normally maintained in open position, said cradle being provided with a spring actuated latch device whereby the members may be secured in closed relation, and with latch releasing means including a ground engaging slide and a flexible connection.

2. In a grain shocking machine, a swingingly supported arm, a constantly driven rotary element, clutch means for operatively connecting the rotary element with the shaft to swing the latter, means for releasing the clutch mechanism at a predetermined time, and a shock forming cradle hingedly connected with and carried by the arm, said cradle comprising two hingedly connected members, each having a bracket hingedly connected therewith, and a pivot member extending through the brackets and also through the arm to connect the cradle with the arm, each of the brackets having a limiting flange to limit the swinging movement of the cradle in one direction with respect to said arm.

3. In a grain shocking machine, a swingingly supported arm, a constantly driven rotary element, clutch means for operatively connecting the rotary element with the shaft to swing the latter, means for releasing the clutch mechanism at a predetermined time, and a shock forming cradle hingedly connected with and carried by the arm, said cradle comprising two hingedly connected members, each having a bracket hingedly connected therewith, and a pivot member extending through the brackets and also through the arm to connect the cradle with the arm, each of the brackets having a limiting flange to limit the swinging movement of the cradle in one direction with respect to said arm, said cradle being of tapering or conical form and the brackets receiving the pivot member being positioned relatively near the small end of said cradle.

4. In a grain shocking machine, a swingingly supported arm, a cradle swingingly supported with and carried by said arm, slidable spring retracted cradle closers, and means for actuating the closers against the tension of the retracting springs to close the cradle on its contents.

5. In a grain shocking machine, a swingingly supported arm, a cradle swingingly connected therewith and carried thereby, said cradle comprising two hingedly connected members and an opening spring for the same, slidably supported spring retracted cradle closers, and means for actuating the latter.

6. In a grain shocking machine, a swingingly supported arm, a cradle swingingly connected therewith and carried thereby, said cradle comprising two hingedly connected members, an opening spring and a spring actuated latch, slidably supported spring retracted cradle closers, and means for actuating the same to close the cradle until the functioning of the latch.

7. In a grain shocking machine, a swingingly supported arm, a cradle swingingly connected therewith and carried thereby, said cradle comprising two hingedly connected members, an opening spring and a spring actuated latch, slidably supported spring retracted cradle closers, and means for actuating the same to close the cradle until the functioning of the latch, said cradle being provided with a latch releasing device comprising a ground engaging slide and a flexible connection.

8. In a grain shocking machine, a swingingly supported arm, a cradle swingingly connected therewith and carried thereby, said cradle comprising two hingedly connected members, an opening spring and a spring actuated latch, slidably supported spring retracted cradle closers, and a mat connected with and extended between said closers to support the cradle.

9. In a grain shocking machine, a swingingly supported arm, a cradle carried thereby, said cradle comprising two hingedly connected members, an opening spring and a spring actuated latch, slidably supported spring retracted cradle closers, means for actuating the closers against the tension of the retracting springs, and a cradle supporting mat of flexible material.

10. In a grain shocking machine, a swingingly supported arm, a cradle carried thereby, said cradle comprising two hingedly connected members, an opening spring and a spring actuated latch, slidably supported spring retracted cradle closers, means for actuating the closers against the tension of the retracting springs, and a cradle supporting mat of flexible material, said closers having opposed walls provided with hooks with which the ends of the mat are connected.

In testimony whereof we affix our signatures.

BENNIE KENT.
ATWELL AUSTIN.

Copies of this patent may be obtained for five cents each, by addressing the "Commissioner of Patents, Washington, D. C."